United States Patent Office

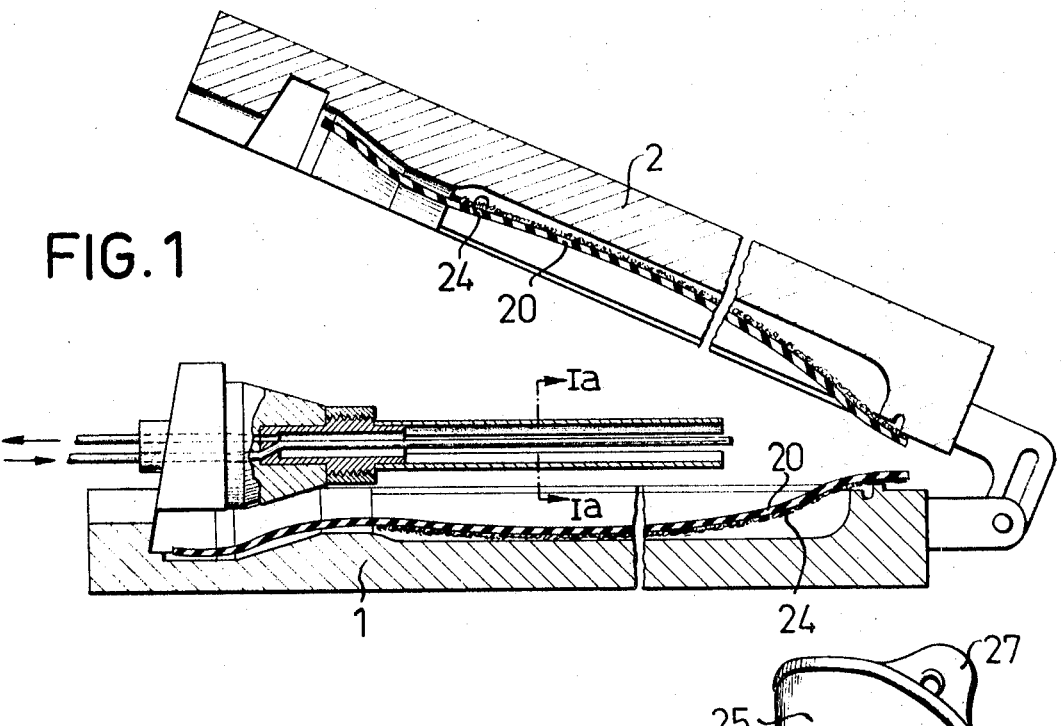
FIG. 1
FIG. 1a
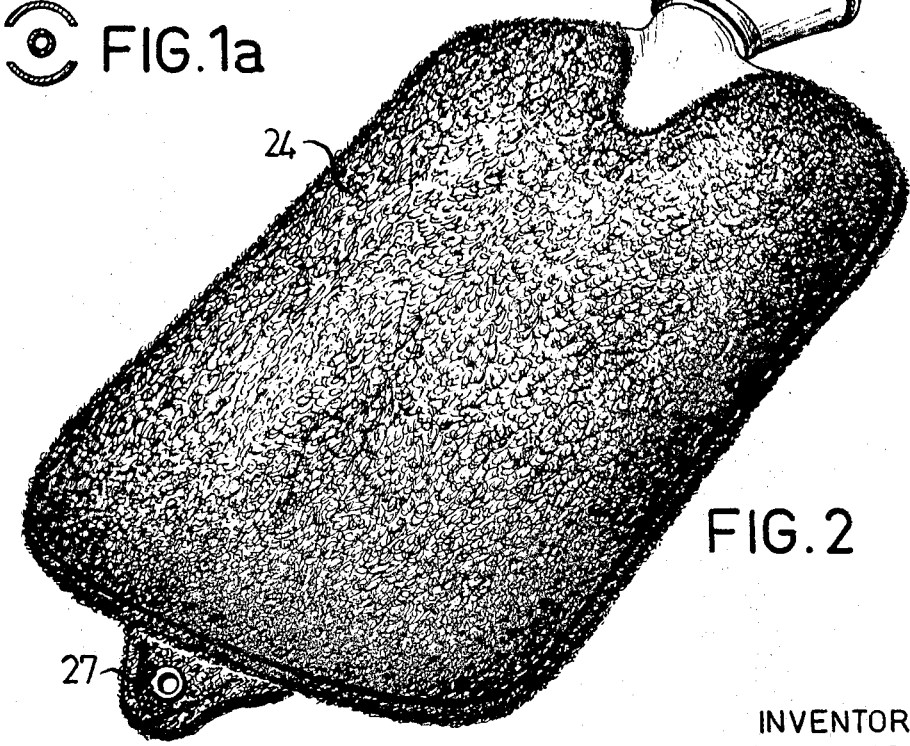
FIG. 2

3,523,848
Patented Aug. 11, 1970

3,523,848
METHOD OF MAKING WARM WATER BOTTLE AND SIMILAR FLAT HOLLOW BODIES OF RUBBER AND RUBBER-LIKE VULCANIZABLE SYNTHETIC MATERIALS
Karl Huff, Ahlem, Hannover, Heinz Moeller, Apelern, Wunstorf, and Rolf Krauss, Langenhagen, Hannover, Germany, assignors to Continental Gummi-Werke Aktiengesellschaft, Hannover, Germany
Filed Oct. 26, 1967, Ser. No. 678,382
Claims priority, application Germany, May 27, 1967, 1,729,586
Int. Cl. B65d 37/00
U.S. Cl. 156—156                                           3 Claims

ABSTRACT OF THE DISCLOSURE

The present invention relates to an improved hollow body of rubber material, especially warm water bottle, which is characterized in that its surface is of a textile material as for instance terry cloth.

---

According to the present invention the hollow body is made by placing in superimposed relationship layers of rubber material and textile material into a vulcanizing mold so that the rubber material is between said textile material, pressing the marginal areas of said layers of rubber material against each other while introducing into the remaining space between said last mentioned layers an inflating medium so as to press said layers of rubber material against the respective adjacent textile material and permeate the same and vulcanizing the thus inflated body.

The present invention relates to warm water bottles and similar flat hollow bodies of rubber or rubber-like vulcanizable synthetic materials, and also concerns a method of making same.

It is an object of the present invention to provide an improved product of the above mentioned type and also to provide a simplified method of making the same.

More specifically, according to the present invention, cuts in conformity with the article to be made, which consist of textile material, are together with unvulcanized plates of rubber material inserted into the vulcanizing mold and after the mold has been closed, the said cuts of textile material are under the effect of the inner pressure pressed into the outer surface of the unvulcanized plates and in the course of the vulcanization are firmly connected thereto. Preferably, cuts of textile material having nearly the shape of the unvulcanized rubber plates are inserted into the vulcanizing mold and within the range of adjacent edges of said plate are brought into contact with each other.

The cuts of textile material may successively be inserted into the mold before or simultaneously with the unvulcanized plates. In the last mentioned instance, the cuts of textile material may already prior to the insertion be brought into loose connection with the unvulcanized plates. Thus, for instance, it is possible to cut both components in superimposed arrangement to the intended approximate dimensions and to loosely connect said components under the effect of the cutting pressure at the respective cutting edges.

As starting material for the envelope there may, depending on the particular circumstances, be employed a woven fabric, a knitted fabric, or a felt or a fleece with fibers which are intermixed at random position or arrested fibers. For warm water bottles, the envelope may advantageously consist of a terry cloth material or any other curly material.

The invention is illustrated by way of example in the accompanying drawing, in which:

FIG. 1 is a section through an opened vulcanizing mold showing the layers forming the warm water bottle to be formed.

FIG. 2 is a perspective view of a warm water bottle made in conformity with the present invention.

Referring to the drawing in detail, the vulcanizing mold shown therein comprises two mold plates linked to each other, namely the bottom plate 1 and the top plate 2 which in closed condition of the mold define the hollow mold chamber therebetween. In the thus formed hollow mold chamber there may be introduced from the outside a pipe for producing inside the mold the inner pressure required for the molding and vulcanizing operation, and also for introducing hot steam.

According to the present invention, prior to inserting the unvulcanized plates 20, cuts of fabric 24 are inserted into the partial chambers of the mold plates 1, 2. The said cuts 24 may consist of a curled fabric, as for instance of the type of terry cloth, and are as to shape roughly similar to the unvulcanized plates 20. In order to be able within the area of the bottle neck 25 to obtain an appealing upper end of the cover, said end may be designed as indicated in FIG. 2. Fundamentally, however, there are no objections against covering also said bottle neck 25 or the suspension ears 27 or the like with the cover material. The plates 1, 2 need not individually be lined with the various components, but, if desired, the layers can be superimposed solely in the bottom plate 1. In this connection, the sequence is of importance: cut 24 of the fabric—lower unvulcanized plate 20—introducing to the valve pipe—upper unvulcanized plate 20—cut 24 of the fabric.

The thus prepared mold is then closed by closing the plates 1 and 2 and is inserted into a vulcanizing press to initiate the vulcanizing process. When the warm water bottle is finish vulcanized and withdrawn from the mold, it is merely necessary to remove the overflow, and the cuts 24 will appear as a coherent single envelope permeated by rubber and firmly connected thereto.

As will be evident from the above, the present invention leads in a rather simple manner to finished products with a textile outer envelope which greatly enhances the value of use of such articles. In addition to warm water bottles, also other articles may, of course, be produced according to the invention, as for instance ice bags, pillows, and air-tight and water-tight containers. Since articles of this type in most instances contact the human body, the envelope around the article makes the contact of the human body with the article more agreeable, aside from the fact that also the handling of the article is greatly improved inasmuch as it will not slip in a wet hand as is frequently the case with articles having a plain rubber surface. Furthermore, the envelope has a heat insulating effect and thus prevents too fast a warming up or cooling off of the contents in the respective article. The invention also simplifies and reduces the cost of manufacture of the vulcanizing mold inasmuch as the heretofore frequently employed engraving of the mold to create a certain pattern will be superfluous.

Heretofore, covers of the type referred to above could be applied only in a non-coherent manner with cements or the like. According to one heretofore known method it was suggested, for purposes of making warm water bottles, to immerse a fabric bag into a latex solution and after the vulcanization of the latex impregnation to tease said bag. In contrast thereto, the present invention eliminates the necessity of employing adhesive means and without additional steps assures a reliable connection of the textile envelope to the rubber walls over the entire surface of the respective article. With the exception of the insertion of the cuts of fabric into the vulcanizing mold, no changes in the customary method are required. The firm connection which is obtained by the partial embedding of the enveloping material in the unvulcanized plates under the influence of the inner pressure contributes, in addition to the realization of the above mentioned advantages, to a desired stiffening of the finished article and permits the employment of thinner wall thicknesses and also the employment of mixtures which are more favorable from a price standpoint.

It is also to be understood that the term "rubber material" as it appears in the claims also includes vulcanizable synthetic materials having rubber-like qualities.

What we claim is:

1. A method of making warm water bottles, in a divided vulcanizing mold, which comprises the steps of: placing into the mold, plates of unvulcanized rubber material cut to the approximate contour of the article to be made and cuts of textile material likewise cut to the approximate contour of the article to be made in superimposed position with regard to each other so that said plates of unvulcanized rubber material will be between said cuts of textile material, pneumatically lifting and partially embedding said cuts of textile material in the unvulcanized rubber material, closing said mold, pressing said plates and cuts of textile material against each other along the marginal areas thereof while simultaneously introducing inflating means in the space between said plates with the exception of the marginal areas thereof, and pressing each plate against and into the respective adjacent cut of textile fabric so as to permeate the latter, and finally finish vulcanizing the inflated body.

2. A method according to claim 1, in which concurrently with said embedding there is superimposing of the cuts of textile material onto the rubber material on each of opposite sides and concurrently enveloping the rubber material with heat curing of edges of the rubber material also into a composite with edges of the textile material during said vulcanizing resulting in embedding and stiffening of at least the edges.

3. A method according to claim 1, in which said vulcanizing simultaneously effects both curing and bonding of the rubber material and also concurrently partially embedding at least peripherally the cuts of textile material with respect to the rubber material into unifying sealed relationship, and stiffening at least peripherally thereof.

References Cited

UNITED STATES PATENTS

| | | | |
|---|---|---|---|
| 1,263,141 | 4/1918 | Strauss | 156—148 |
| 1,310,439 | 7/1919 | Roberts | 156—156 |
| 2,289,777 | 7/1942 | Hazell | 156—148 |
| 3,138,506 | 6/1964 | Ross | 156—156 |

JOHN T. GOOLKASIAN, Primary Examiner

J. D. SMITH, Assistant Examiner

U.S. Cl. X.R.

150—21; 156—285; 161—67; 264—93